United States Patent Office.

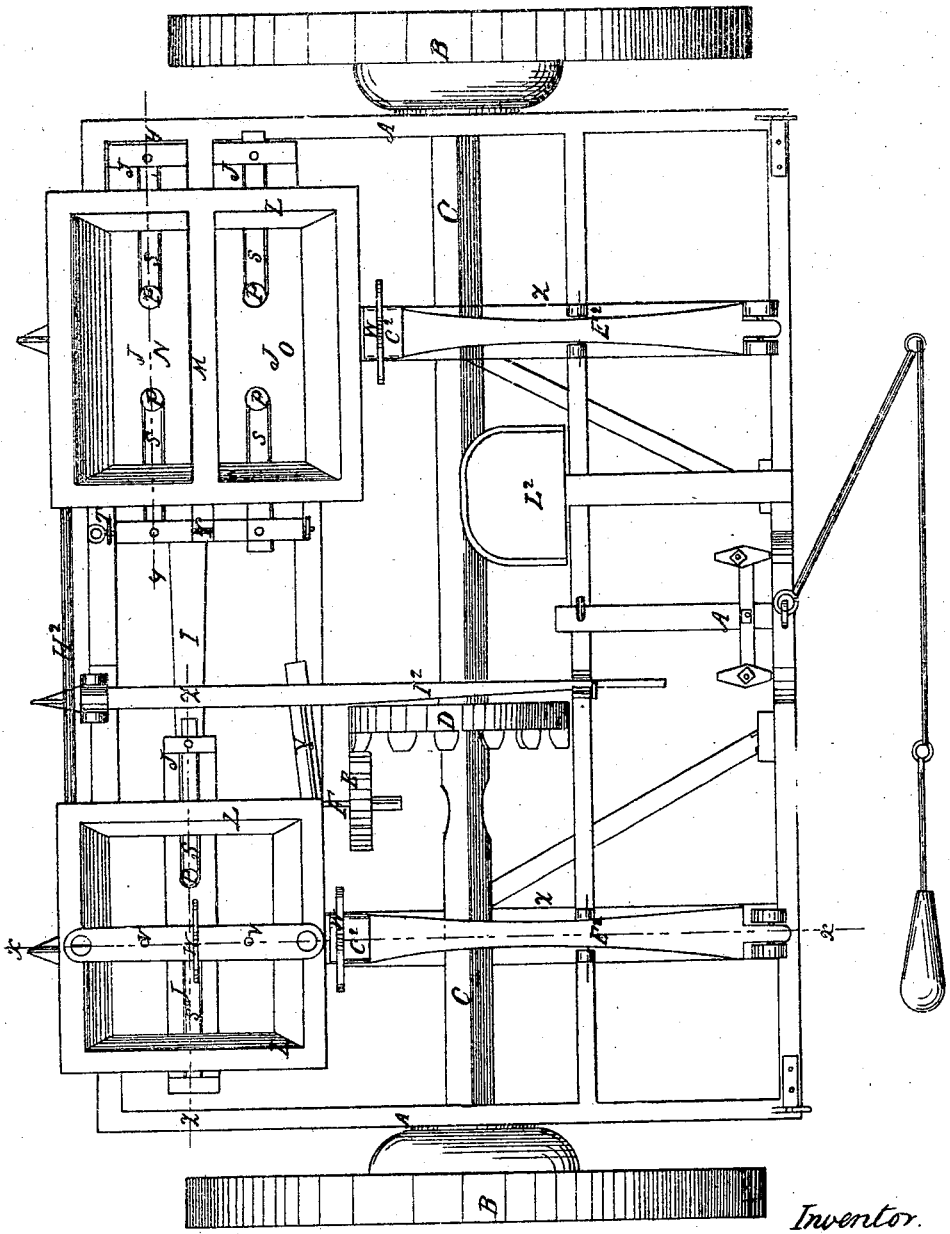

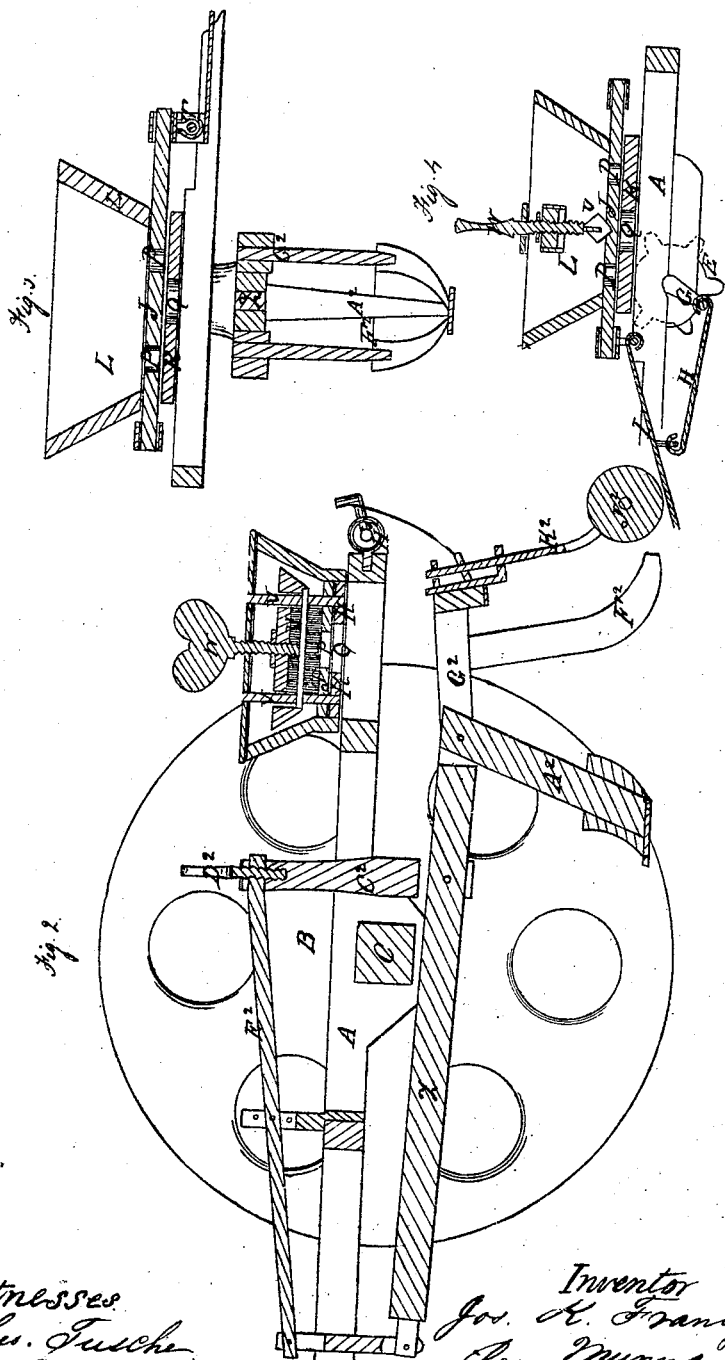

JOSEPH K. FRANTZ, OF GOODVILLE, PENNSYLVANIA.

Letters Patent No. 72,472, dated December 24, 1867.

---

IMPROVEMENT IN SEED-PLANTERS.

---

The Schedule referred to in these Letters Patent and making part of the same.

---

TO ALL WHOM IT MAY CONCERN:

Be it known that I, JOSEPH K. FRANTZ, of Goodville, in the county of Lancaster, and State of Pennsylvania, have invented new and useful Improvements in "Seed-Planters;" and I do hereby declare that the following is a full, clear, and exact description thereof, which will enable others skilled in the art to which my invention appertains to make and use the same, reference being had to the accompanying drawings, making a part of this specification, in which—

Figure 1, plate 1, is a plan or top view of a seed-planter constructed according to my improvements.

Figure 2, plate 2, a vertical section taken in the plane of the line $x\ x$, fig. 1, plate 1.

Figures 3 and 4, plate 2, sections taken respectively in the planes of the lines $y\ y$ and $z\ z$, fig. 1, plate 1.

Similar letters of reference indicate corresponding parts in the drawings.

This invention relates to improvements in seed-planters, and it consists in the arrangement of the pinion-wheel engaging with the crown-gear wheel upon the axle, the shaft of the pinion-wheel provided with a crank, and connected to the slides operating in the hopper by means of a hinged rod and plate, whereby the grain is distributed or dropped; in adjusting the depth of the ploughs by two different means—first, by a thumb-screw, and secondly, by means of a crank-rod connected to a lever; and the invention further consists in providing an adjustable brush in the hoppers, whereby the slides are kept clean in regulating the quantity of seed to be distributed from the hoppers; and lastly, in the means employed to throw the pinion-wheel in and out of gear with the crown-gear wheel upon the axle, as will be hereinafter more fully described.

A, in the drawings, represents the supporting or carrying-frame of the machine or planter, which is suitably constructed to receive and support its various working parts; B, the driving-wheels, one at each end of an axle, C. One driving-wheel is arranged to turn loosely upon the axle, while the other, turning with the axle, is thus made to impart motion to the parts for delivering the seed to the ground, as will be hereinafter described. On axle C is secured a crown-gear wheel, D, to engage with which is a gear or pinion-wheel, E, at one end of a crank-shaft, F, arranged to turn in bearings of the frame A at its rear end. To the crank-portion G of the shaft F is hung one end of a pitman-rod, H, that, at its other end through a plate, I, is connected or pivoted to the slides J, arranged to move through the bottoms K to the hoppers L, in which the seed are placed for being distributed or sowed. There are two hoppers, L, placed upon the frame A, one of which hoppers is divided by a cross-partition, M, into two chambers, N and O, to and in the bottoms of each of which there is one of the slides J, hereinabove referred to. The slides J are arranged to move across the hoppers, and in the slides holes P are made, that, as the slides move forward and backward, pass over and to corresponding holes Q in the bottom of the hoppers, thus allowing the seed to drop or pass through the same to the ground, the quantity of seed thus passing through the hoppers being regulated by increasing or diminishing the size of the holes in the slides, by properly adjusting the supplementary sliding pieces S therefor. To disconnect any one or more of the slides to the seed-hoppers or boxes from the driving-power, it is only necessary to remove the pin or pins T by which the slides are connected or pivoted thereto. In the single hopper of the machine a brush, U, is shown, as arranged to brush and clear the seed from the slides, as they move forward and backward. This brush is held stationary by fixed posts, V, on which the holder for the bristles is adjusted to bear with a greater or less force upon the slides by means of a thumb or set-screw, W, properly applied therefor. The pinion-crank shaft F is hung so that it can be swung to bring the pinion into or out of gear with the driving-gear wheel of the axle. Y, a lever-handle, connected with shaft F for convenience in operating or moving it. Z, beams, hung at one end to the under side of the frame A, and extending from its front to its rear side, where, upon their outer ends, they each carry, through uprights $A^2$, plough-blades $B^2$, for ploughing or furrowing the ground to receive the seeds that fall through and from the hopper, as the machine moves forward and in advance of such distribution of the seed. $C^2$, uprights pivoted to plough-carrying beams Z, from which they extend upward, and have screwed into their upper ends set or thumb-screws $D^2$, that are inserted in the outer ends of inclined beams or rods $E^2$ hung to the upper side of the frame A. By means of the thumb-screws $D^2$ the plough-blades can be adjusted to plough a greater or less depth in the ground. $F^2$, the covering-shares, for covering the seed with earth, after being laid or deposited in the ground furrows. These covering-shares are fastened to a frame, $G^2$, hung underneath the framework A below the hoppers, and the two frames are connected to a common cross-rod, $H^2$, at the rear of the machine, that is connected to a centre operating-rod, $I^2$, by which the said covering-shares can be swung into or out of operation, to a greater or less extent, as may be found desirable or necessary. $J^2$, rollers hung to the lower slotted ends of uprights $K^2$, swivelled to the rear side of the framework in a vertical position, so as to turn thereon, these rollers acting to press or roll down the earth as it is thrown over the seed by the action of the covering-shares. $L^2$, the driver's seat, located in such part of the machine as will bring the driver most convenient to operate and drive the same.

Having thus described my invention, I claim as new, and desire to secure by Letters Patent—

1. The plough-blades $B^2$ and covering-shares $F^2$, adjusted by means of the thumb-screws $D^2$ in the beams $E^2$ and uprights $C^2$, secured to the carrying-beams Z, and by the lever $I^2$ attached to the cross-rod $H^2$ at the rear of the machine, as herein described for the purpose specified.

2. The brush U in the hopper L, adjusted by means of the thumb-screw W and guide-posts V, as herein described for the purpose specified.

3. The hand-lever Y and lever $I^2$ in combination with the shaft F, for throwing the pinion E in and out of gear with the crown-wheel D, as herein described for the purpose specified.

JOS. K. FRANTZ.

Witnesses:
DAVID MARTIN,
JOHN G. KURTZ.